(No Model.) 8 Sheets—Sheet 1.

T. S. CRANE.
MACHINE FOR MAKING SPIRALLY JOINTED TUBES.

No. 393,743. Patented Dec. 4, 1888.

Attest:
L. Lee.
F. C. Fischer

Inventor.
Thos. S. Crane, per
Crane & Miller, Attys.

(No Model.) 8 Sheets—Sheet 2.
T. S. CRANE.
MACHINE FOR MAKING SPIRALLY JOINTED TUBES.
No. 393,743. Patented Dec. 4, 1888.

Attest:
L. Lee.
F. C. Fischer.

Inventor.
Thos. S. Crane, per
Crane & Miller, Attys.

(No Model.) 8 Sheets—Sheet 3.

T. S. CRANE.
MACHINE FOR MAKING SPIRALLY JOINTED TUBES.

No. 393,743. Patented Dec. 4, 1888.

Attest:
L. Lyy.
F. C. Fischer.

Inventor.
Thos. S. Crane, per
Crane & Miller, Attys.

(No Model.) 8 Sheets—Sheet 4.

T. S. CRANE.
MACHINE FOR MAKING SPIRALLY JOINTED TUBES.

No. 393,743. Patented Dec. 4, 1888.

Attest:
L. Lee.
F. C. Fischer.

Inventor.
Thos. S. Crane, per
Crane & Miller, attys.

(No Model.)  8 Sheets—Sheet 6.

T. S. CRANE.
MACHINE FOR MAKING SPIRALLY JOINTED TUBES.

No. 393,743.  Patented Dec. 4, 1888.

Attest:
L. Lee
F. C. Fischer

Inventor.
Thos. S. Crane, per
Crane & Miller, Attys.

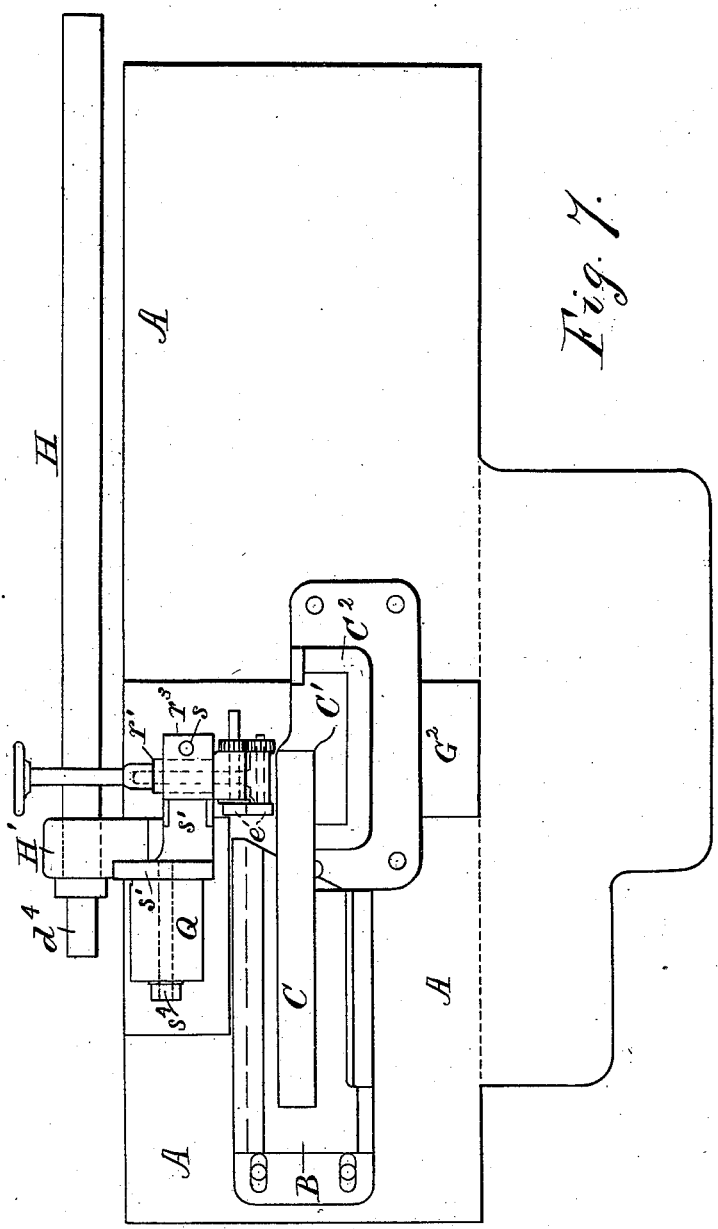

(No Model.) 8 Sheets—Sheet 8.
T. S. CRANE.
MACHINE FOR MAKING SPIRALLY JOINTED TUBES.
No. 393,743. Patented Dec. 4, 1888.
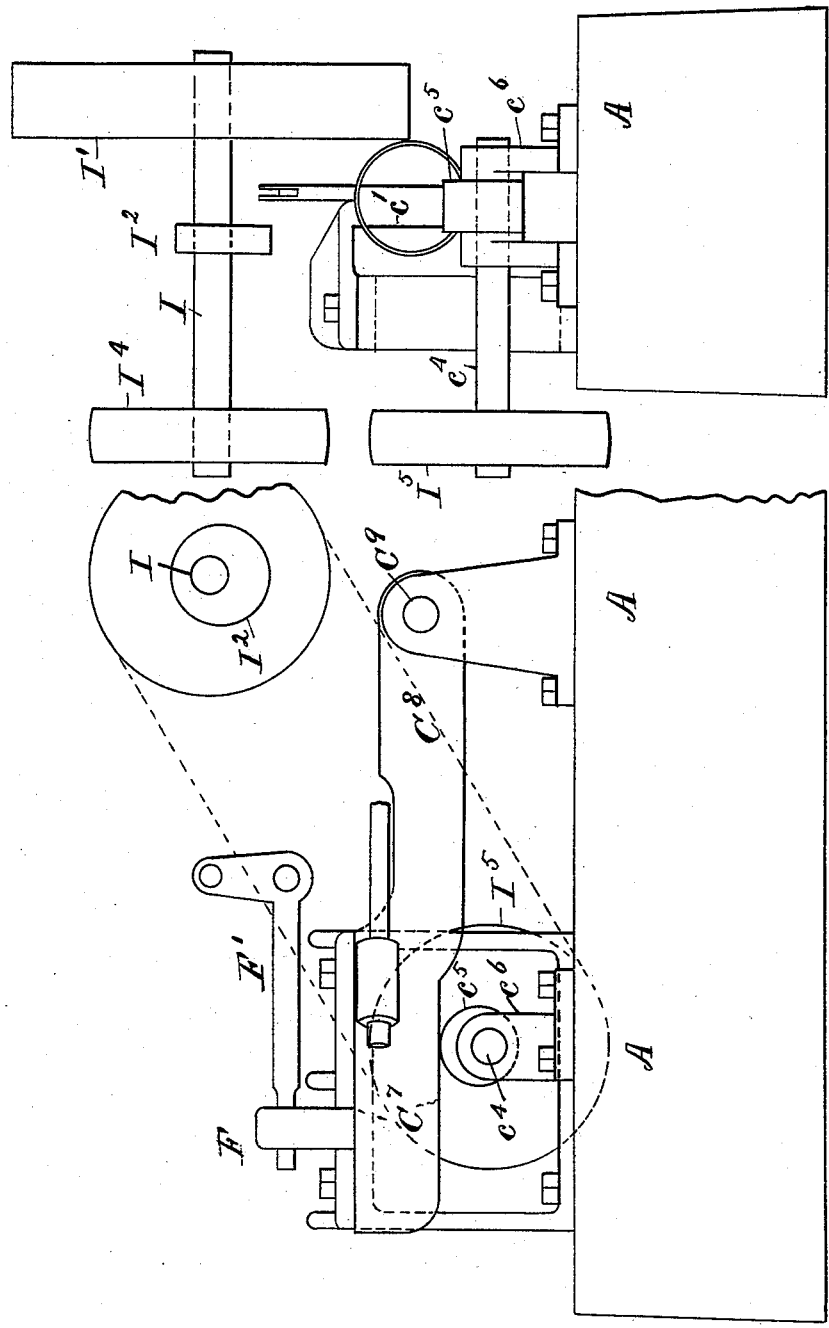

UNITED STATES PATENT OFFICE.

THOMAS S. CRANE, OF EAST ORANGE, NEW JERSEY.

MACHINE FOR MAKING SPIRALLY-JOINTED TUBES.

SPECIFICATION forming part of Letters Patent No. 393,743, dated December 4, 1888.

Application filed March 17, 1888. Serial No. 267,454. (No model.)

*To all whom it may concern:*

Be it known that I, THOMAS S. CRANE, a citizen of the United States, residing at East Orange, Essex county, New Jersey, have invented certain new and useful Improvements in Spiral-Seam Tube-Welding Machines, fully described and represented in the following specification and the accompanying drawings forming a part of the same.

This invention relates to that class of machines in which a sheet-metal skelp is fed obliquely to a pipe, which is formed by bending and winding the end of the skelp in a spiral manner, so as to project the pipe continuously from one edge of the skelp, and the object of the invention is to furnish an improved means of forming and welding the sheet-metal skelp.

The improvements consist partly in the use of friction-rollers for feeding the skelp; partly in the combination with a vibrating hammer of a movable anvil rigidly sustained during the welding-blow; partly in the combination with such movable anvil of a former operating in conjunction therewith upon the outer side of the sheet metal, and partly in the details of construction for operating the former, the hammer, and the feeding devices.

The invention will be understood by reference to the annexed drawings, in which—

Figure 1:
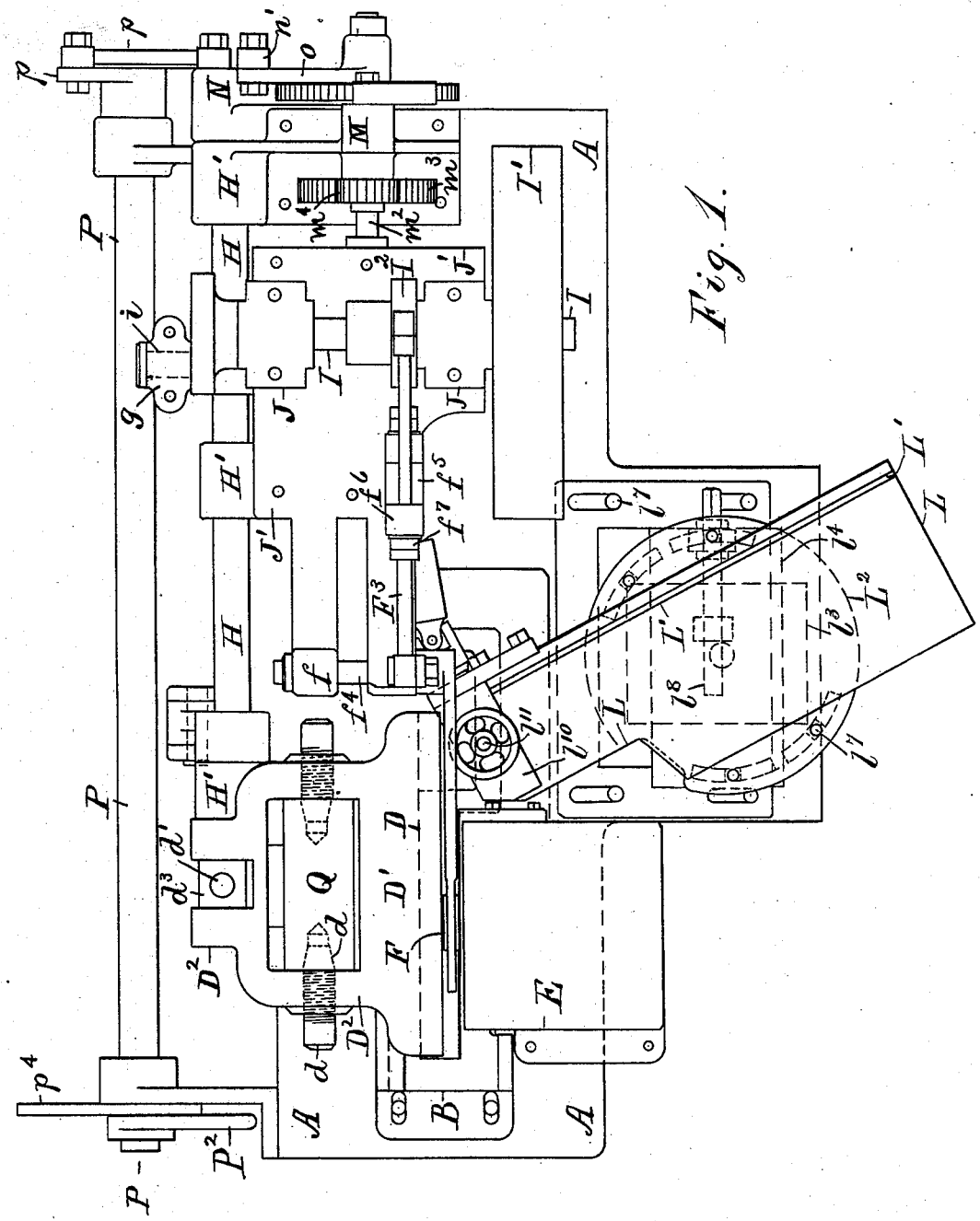
Figure 2:
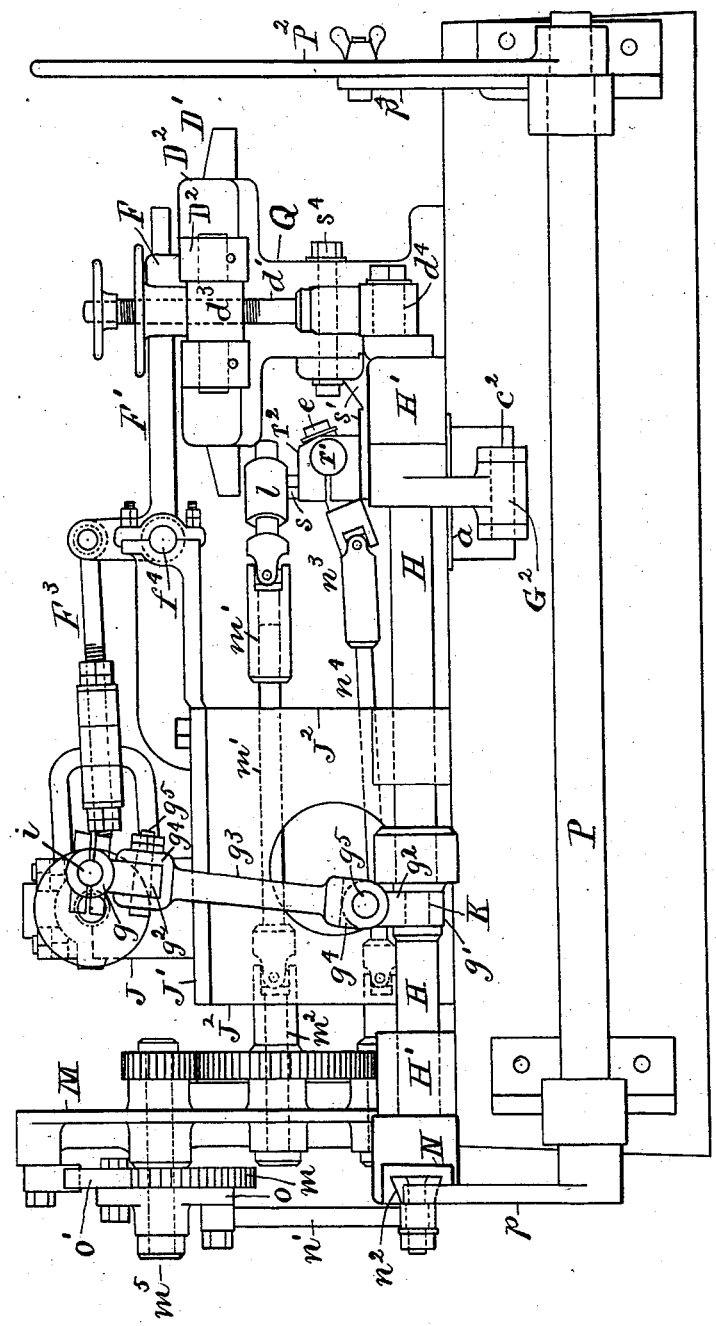
Figure 3:
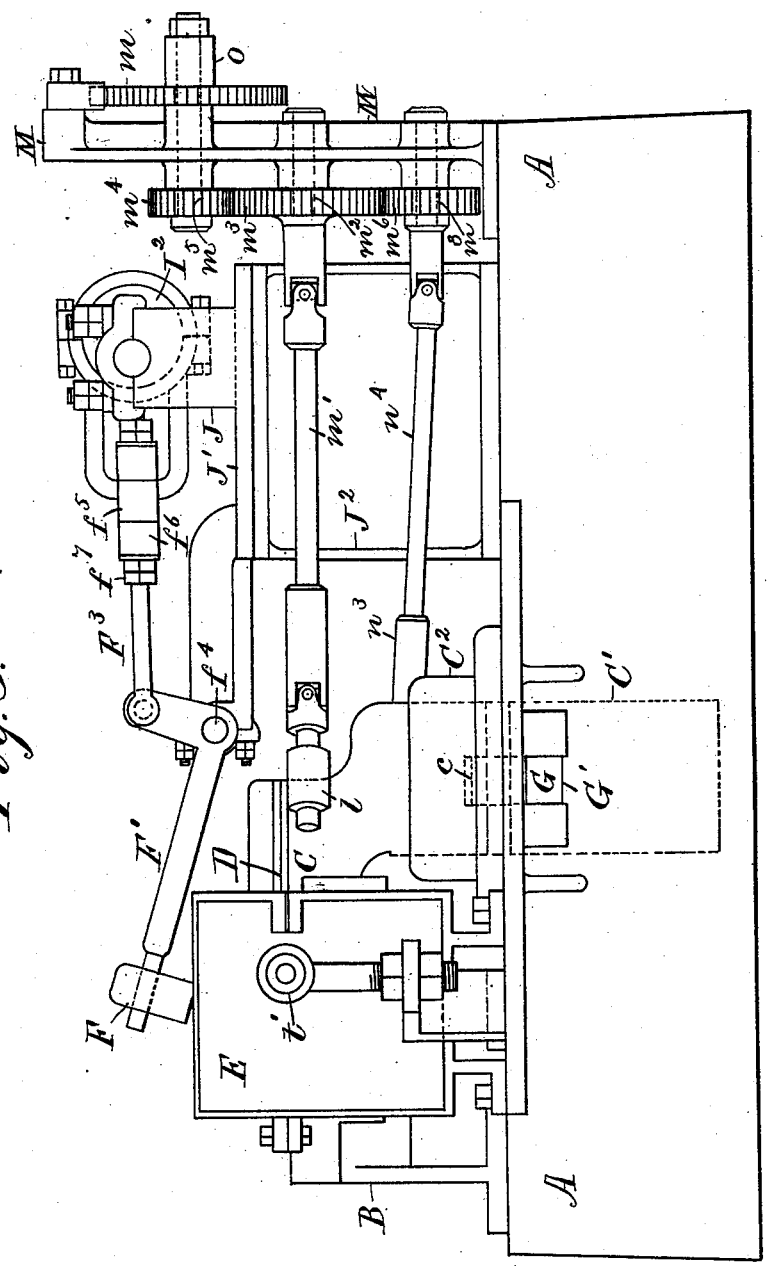
Figure 4:
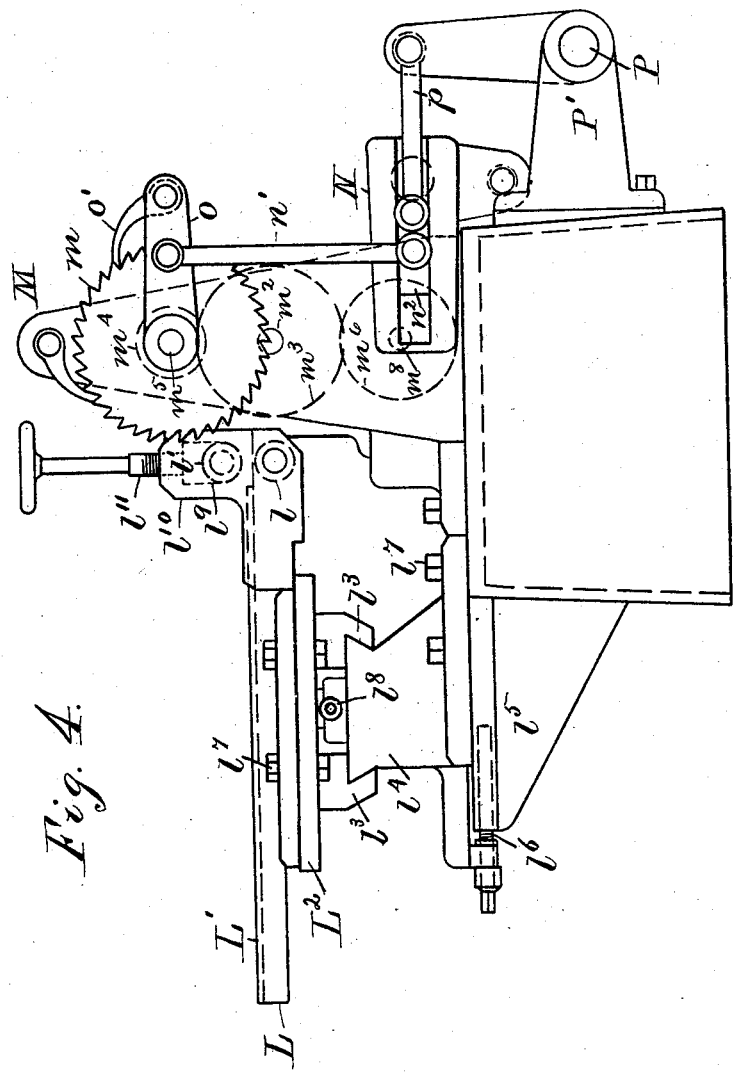
Figure 5:
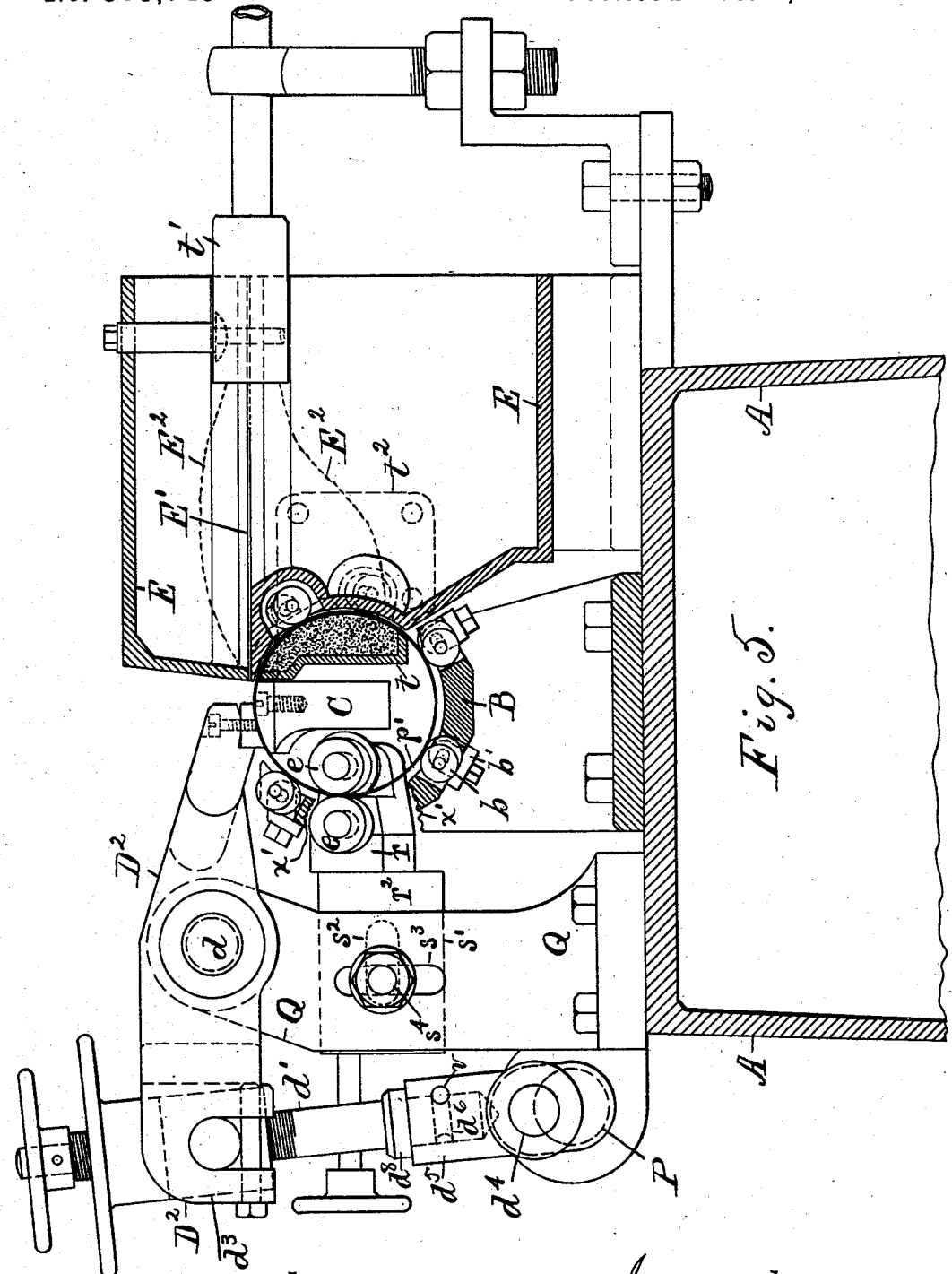
Figure 6:
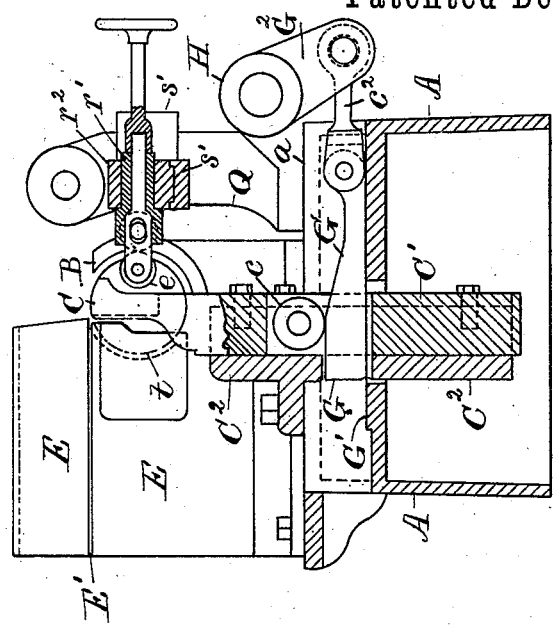
Figure 8:
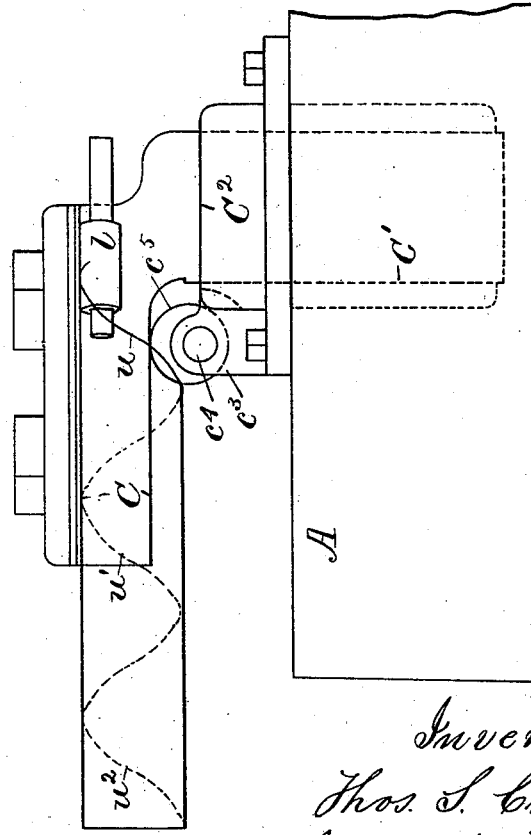

Figure 1 is a plan of the entire machine. Fig. 2 is a rear elevation of the same. Fig. 3 is a front elevation of the same. Fig. 4 is an end elevation of the bed with the feeding appliances only mounted thereon. Fig. 5 is an end elevation, upon a larger scale, of the forming devices with a portion of the pipe-mold and furnace in section, and mold broken away between the lines $x'$ $x'$ to expose the feed-rolls $e$. Fig. 6 is an end elevation of the anvil and its actuating mechanism with part of the base or bed and the rear side of the furnace, the parts being in section where hatched. Fig. 7 is a plan of the bed with the anvil, the pipe-mold, the post Q, and the auxiliary feed upon its upper side, and the rock-shaft H. Fig. 8 is a front elevation of part of the bed with the anvil and a cam for raising the same. Fig. 9 is a similar view with an anvil of different construction; and Fig. 10 is an end view of the parts shown in Fig. 9.

A is the bed of the machine; B, a mold containing rollers to form the pipe into cylindrical shape; C, the movable anvil projected within the pipe at the end where the skelp is applied.

D is a former for bending the skelp against the surface of the anvil as the skelp is fed into the pipe-mold.

E is the furnace for heating the sheet metal, and F is the head of the hammer for pressing the heated portions upon the anvil at the point where the skelp makes a tangent with the pipe.

The rollers $b$ are inserted through apertures in the sides of the pipe-mold, and are secured thereto by brackets $b'$, the rollers being set parallel with the spiral seam of the pipe and arranged within the mold to support different portions of the sheet metal before and after it is welded into cylindrical form.

The top of the anvil, like the pipe, is parallel with the bed A when raised, and is shown in Figs. 5, 6, and 7 affixed to the head of a vertical slide, C', fitted to move vertically in a socket, $C^2$, upon the bed, and is elevated prior to each blow of the hammer by a wedge, G, sustained upon a seat, G', and moved transversely to the slide. The inclined surface of the wedge is fitted to a roller, $c$, upon the slide, and the head of the wedge is terminated by a bearing, $c'$, parallel with the seat G', and which bearing operates when drawn beneath the roller to hold the anvil rigidly in an elevated position, in contact with the inner side of the pipe.

The top face of the anvil is extended across the entire width of the skelp and within the pipe beyond the seam to co-operate with a former upon the exterior of the pipe for bending the sheet-metal skelp to the desired curve as it is fed to the pipe. The pipe is thus firmly sustained beneath the blows of the hammer, and the anvil, by its co-operation with both the hammer and the former, performs a double function by operating, as it rises, to bend the sheet metal against the former, and after it is wholly lifted to sustain the metal under the blows of the hammer.

It is obvious that with a movable anvil the former may be either movable or stationary, the former construction being shown in Figs. 1, 2, and 5 and the latter construction in Figs. 8 and 9. In the earlier figures the former is shown attached to the front end of a bending-lever constructed as a frame having a bar, D′, to carry the former, and arms D², pivoted upon a stationary fulcrum, d, and actuated at their rear ends by a toggle, which, when straightened, locks the former in contact with the exterior of the pipe. One of the arms of the toggle is constructed as a screw, d′, tapped into a nut, d³, which is pivoted in the lever-arms D², and the other arm of the toggle is formed as a crank, with pin d⁴ affixed to a rock-shaft, H. The fulcrum d of the former D is mounted parallel with the surface or axis of the pipe, so that the former is parallel with the pipe during all its movements. By this construction the former is separated from the pipe an equal amount through its entire length when opened, and a greater space is left for ventilation and for inspection of the pipe than with a former hinged at one end upon a pivot transverse to the pipe. The rock-shaft is oscillated by a connection to a pulley-shaft, I, which is provided with belt fly-wheel I′ and with an eccentric, I², for vibrating the hammer. The bearings J for the shaft I are mounted upon a plate, J′, on the top of a stand, J², and bearings f are projected from the plate to sustain the fulcrum f⁴ of the hammer-helve F′, which is provided with an arm, F², for connection with the eccentric-rod F³. The rod is fitted through a socket, f⁵, upon the eccentric-strap, and is provided with india-rubber collars f⁶ and jam-nuts f⁷ upon each side of the socket, by means of which the rod can be lengthened and shortened and the pressure of the blow delivered upon the sheet metal may be varied at pleasure.

The shaft I is provided at its rear end, over the rock-shaft H, with a crank and pin, i, which is connected with an arm and crank-pin, K, upon the rock-shaft by a double-jointed connecting-rod.

The shaft I rotates at right angles to the shaft H, and the boxes g and g′, which are fitted, respectively, to the two crank-pins, are provided with ears g², to which an intermediate rod, g³, is pivoted by forked ends g⁴ and pins g⁵ at its opposite ends. The rotation of the crank-pin i in one plane is thus converted into the oscillating motion in a different plane of the crank K upon the shaft H. Besides operating the toggle for the former, the rock-shaft is employed to actuate the feeding devices and the wedge for raising the anvil.

In Fig. 6 the seat G′ is shown sunken below the surface of the bed, so that it may be covered by guards a, for protection from the scale and water which drop from the pipe, and the wedge is connected by a link, e², with a crank arm and pin, G², fixed upon the rock-shaft H. The feeding agents consist in primary rolls l and l′, mounted upon the skelp-table L, and in auxiliary rolls e e′, applied to the rear edge of the skelp after it is curved by the former. The rollers are rotated by gearing and a ratchet-wheel mounted upon a stand, M. The ratchet-wheel m is provided with a pawl-arm, o, and pawl o′, and the rock-shaft H is provided with a slotted feed-crank, N, carrying a crank-pin, n, which is linked to the pawl-arm by a rod, n′. The pin n is fixed in a sliding block, n², and a hand-shaft, P, is mounted adjacent to the crank N and provided with a link, p, to move the block n² to and from the center of the shaft H. The pin n is shown in Fig. 4 in its middle position, and adapted to produce an average feed by moving the pawl o′ upon the ratchet-wheel m, while a greater or less feed will be produced by moving the pin n to or from the shaft H in the slotted crank N.

The lower feed-roll, l, is shown in Fig. 2 exposed by the removal of the skelp-table, and connected by universal couplings and shaft m′ with a shaft, m², mounted in stand M. The stand M also carries the shaft m⁵ of the ratchet-wheel m, which is connected with the shaft m² by gear-wheels m³ m⁴, and by a gear, m⁶, with a shaft, m⁸, to operate the auxiliary feed.

The fulcrum d for the former-lever is formed upon the top of a post, Q, independent of the pipe-molds, so that the latter may be interchanged beneath the former D to make different sizes of pipe in the same machine, and the post is utilized to sustain an adjustable swiveling carrier, r, by which the auxiliary rolls e are sustained in contact with the inner end of the pipe p′. The carrier is provided with a round shank, r′, fitted to a box, r², which is secured by a bolt, s, upon a bracket, s′, attached to the side of the post Q, and the bracket itself is provided with a horizontal slot, s², and the post with a vertical slot, s³, so that it may be adjustable thereon in both a horizontal and vertical direction and then clamped thereto by a bolt, s⁴.

The fitting of the round shank in the box r² permits the angular adjustment of the rollers to suit the inclined edge of the skelp at the inner end of the pipe. The shafts of the feed-rolls are journaled in the carrier r, and one of them is connected by couplings n³ and shafts n⁴ with the shaft m⁸. The auxiliary feed-rollers are thus rotated simultaneously with the primary rolls l l′, and the regulation of the feed and the stopping of the same, which is accomplished by shifting the pin n to the center of the crank N, is effected by a hand-lever, P², affixed to the hand-shaft P, and locked in place, when adjusted, by a bolt and nut, p³, in a slotted segment, p⁴, which is shown only in the edge view in Fig. 2. Such slotted segments are already well known and are commonly used for holding a movable lever in a fixed position. By this apparatus the feed can be stopped, accelerated, or retarded while the machine is in motion.

The skelp-table L (shown in Figs. 1 and 4) consists in a plate with a gage-strip or guide, L′, fixed at one edge to direct the skelp into the pipe-mold and furnace, the latter being formed with an aperture or slit, E′, through which one edge of the skelp passes before reaching the anvil, and is subjected to the required heat therein.

The inner side of the furnace adjacent to the pipe is concave, as shown in Fig. 5, and is in practice filled internally with refractory material, as fire-clay, (not shown in the drawings,) having tuyere $t'$ (for delivering air and gas) inserted in its rear side, and an internal passage (shown by the dotted lines $E^2$) for the flame to strike the edge of the blank or skelp in the slit $E'$ and to operate upon the edge of the pipe previously formed, which moves between the front of the furnace and a so-called "lip," $t$, which is secured to the side of the furnace by a foot, $t^2$, and projected into the previously-formed pipe at its rear end.

It will be seen in Figs. 1 and 5 that the front edge of the furnace is separated from the former D sufficiently for the hammer F to strike the hot metal as it moves from the furnace upon the nearer side of the anvil.

The skelp-table is mounted upon a slotted circular plate, $L^2$, which is fitted by ways $l^3$ to move longitudinally upon a rest, $l^4$, the rest being also movable transversely upon a bracket, $l^5$, projected from the bed and adjusted thereon by a screw, $l^6$. The circular plate is provided with a nut and the rest with a screw, $l^8$, to set the plate longitudinally. The skelp-table may thus be set at the desired angle with the pipe, and when adjusted is clamped upon the slotted plate $L^2$ and upon the bed by bolts $l^7$. The upper primary roller, $l'$, is mounted in practice in a frame, $l^9$, which is movable in a housing, $l^{10}$, affixed to the forward end of the skelp-table at one edge only. The frame $l^9$, with the roll $l'$, is movable to and from the lower roll, $l$, by means of a screw, $l^{11}$, and the rolls may thus be made to grip the skelp with any desired degree of force for feeding it to the mold, while one edge of the skelp projects from between the rolls opposite the housing $l^{10}$ and penetrates the slit $E'$ in the furnace to receive the heat as desired.

The teeth upon the gear-wheels $m^3$, $m^4$, and $m^6$ are indicated in Fig. 2 of the drawings, but are omitted from Fig. 4, and the peripheries of the wheels merely indicated by dotted lines, as they lie behind the gear-stand M.

In Fig. 1 the bearings $H'$ for the rock-shaft are shown affixed, respectively, to the post Q. The stand $J^2$ and the gear-stand M and the slots upon the shaft in Fig. 7, to which such bearings would be fitted, are similarly indicated by the letter $H'$, the shaft being introduced in the latter figure to show the connection of the crank-arm and pin $G^2$ with a link, $c^2$, and wedge G for raising the anvil.

The rolls $b$ are omitted from the pipe-mold in Fig. 7, as they are not my invention, and only the apertures $b^2$ are shown, through which the rolls would be inserted. The mold constructed with anti-friction rolls set at any angle will be claimed in a separate patent application. The screw $d'$, which constitutes a part of the toggle for operating the former-levers $D^2$, is adapted to turn for adjusting the pressure of the former D by a swivel-connection with the eye $d^5$, by which it is attached to the pin $d^4$. A collar, $d^8$, is formed upon the screw, to bear upon a hub projected from the eye, and a groove, $d^6$, is formed in the screw within the hub, and a pin, $v$, is inserted through the hub to permit the turning of the screw upon the eye, while the collar $d^8$ sustains all the pressure of the toggle.

Fig. 8 is a diagram showing in front elevation, similar to Fig. 3, a modified construction for the anvil, with the rigid support upon the bed formed as a rotating or oscillating shaft, with a cam applied to the under side of the anvil; and Fig. 9 represents in similar elevation an anvil formed as a lever, hinged at one end, with a rotating or oscillating cam in contact with its under side near the rear end of the pipe-mold.

In Fig. 8 the front of the anvil-socket $C^2$ is shown, provided with bearings $c^3$ for a rotating or oscillating shaft, $c^4$, and a cam, $c^5$, is shown upon said shaft in contact with the under side of the bar forming the anvil C. The cam is shown of eccentric form, with its highest point in contact with the anvil-bar, and it is obvious that its rotation or oscillation in either direction would operate to alternately lower the anvil and to raise the same again to its normal position, while the highest point of the cam would serve to lock the anvil in such position and to afford it a rigid support upon the base A during the welding operation.

In Fig. 9 the anvil is shown of different construction, but similarly sustained during the welding operation by a rigid support upon the base A, the anvil $C^7$ being formed at one end of a horizontal lever, $C^8$, which is pivoted by a pin, $C^9$, to a suitable standard upon the base, and the cam-shaft $c^4$ and cam $c^5$ are sustained in bearings $c^6$, supported upon the bed or base beneath the anvil $C^7$.

In Figs. 8, 9, and 10 the former is shown affixed rigidly to the pipe-mold, and such construction may be used in certain cases, as the lowering of the anvil after each forming operation releases the sheet metal so that it may be fed forward. The line of the spiral seam upon the pipe is shown in Fig. 8 by the dotted lines $u'$ $u^2$, and the full line $u$ shows the edge of the newly-applied and bent skelp as it moves downward beneath the anvil from the former D, to pass between the lip $t$ and the concave front of the furnace, and it is obvious that the nearest support which can be applied to the anvil to sustain it rigidly upon the base must avoid interference with the edge of the skelp. (Indicated by the line $u$.) In constructing the anvil upon a vertical slide, as in Figs. 3 and 6, the slide is therefore attached to the anvil-bar in the rear of the line $u$, while in the case of the lever-anvil (shown in Fig. 9) the cam is applied to its under side, as closely as possible to the line $u$, to furnish the rigid support desired, the bearings for the cam-shaft resting directly upon the base, like the seat G', which sustains the wedge for raising the anvil in Fig. 6.

In a machine having a cam to raise the anvil, the cam-shaft $c^4$, being parallel with the belt-wheel shaft I, would be readily driven from such shaft by belting or cog-wheel connections therefrom. The chief object of moving either the anvil or former from contact with the pipe is to prevent chilling the sheet metal unduly prior to the blow of the hammer, and to prevent the fouling of the surfaces by scale or slag from the furnace. It is, however, essential to the formation of a smooth seam upon the exact periphery of the pipe to have the surface which supports the blow within the pipe constituted as a solid anvil or support rigidly in contact with the interior of the pipe, and any means which furnishes such support will effect the object of my invention. It is, however, immaterial how the rigid support be applied to the anvil, or how the same be moved to and from the inner surface of the pipe, provided it be sustained during the welding operation by a rigid support fixed upon the base. It has been common heretofore to use hammers acting in opposition to one another upon the seam, one of such hammers operating within and the other without the pipe. Such prior constructions have commonly been formed as jointed levers of the first order, having a fulcrum intermediate to their ends and actuated by pivoted connections, which were liable to become loose and cause lost motion or play in the action of the lever. The part inside the pipe, which in my construction is a rigid anvil, was therefore in such jointed constructions merely a sort of hammer. In such a construction the hammer within the pipe operated largely by its momentum, the same as the hammer upon the outside of the pipe, and the precise point of contact between two such moving hammers was not a fixed point, as it should be to close the weld exactly upon the periphery of the pipe. The momentum of the hammer within the pipe and of the hammer outside the pipe was therefore liable to be affected (owing to variations in their weights) by any variations in the speed of the machine, and an excess of momentum in either one has in practice operated either to indent the pipe at the seam by excessive pressure upon the outside, or to bulge the pipe by excessive pressure upon the inside of the seam. The diameter of the pipe at the seam would therefore be irregular and the uniformity of its size and appearance materially marred. To give the hammer within the pipe a degree of inertia, the lower hammer has sometimes been weighted to compensate for the shorter swing of such hammer within the pipe; but it is obvious that an increase in speed must tend to give such weighted hammer a greater momentum than the one outside the pipe, and to thus press the seam outward, as just stated.

My anvil is adjusted in the construction of the machine to such point within the pipe that the seam, when welded, may be, as nearly as possible, even with the surface of the pipe, and its rigid support upon the base during the welding operation sustains it firmly at such point within the pipe, independent of all such variations in the speed of the machine or of the force of the hammer-blow delivered upon it.

The means shown herein for moving the hammer (by the two elastic rubber collars $f^6$ and the adjusting-nuts $f^7$) may be adjusted to deliver a harder or lighter blow upon the seam, and, the anvil being sustained with entire rigidity beneath the hammer, such variation in the force of the blows produces no distortion of the pipe in the manner effected by previous constructions under different conditions of operation.

A movable former for bending or curving the blank is not essential to the working of the anvil in the manner described, as it is obvious that the former exerts its function chiefly when pressed upon the metal at the limit of its stroke, and that at such time it operates the same as a stationary former, against which the metal would be pressed by the moving anvil.

The face of the anvil is made wide enough transversely to sustain the pipe beneath the hammer, and to press the blank or skelp against the former, and is adapted as well to co-operate with a stationary as with a movable former to perform such functions.

Having thus set forth the nature of my invention, what I claim is—

1. In a spiral-seam tube-welding machine, the combination, with suitable means for forming, heating, and welding the sheet metal, of a movable anvil projected within the newly-applied skelp, a base supporting the pipe-making fixtures, and means, substantially as described, for sustaining the anvil during the welding operation by a rigid support upon the said base, as and for the purpose set forth.

2. In a spiral-seam tube-welding machine, the combination, with suitable means for forming, heating, and welding the sheet metal, of a movable anvil projected within the newly-applied skelp, a base supporting the pipe-making fixtures, and a moving cam supported upon a bearing on the base and operated to raise the anvil within the skelp and to sustain it rigidly during the welding operation, as and for the purpose set forth.

3. In a spiral-seam tube-welding machine, the combination, with suitable means for heating and welding the sheet metal, of a movable anvil projected within the newly-applied skelp, a base supporting the pipe-making fixtures, means, substantially as described, for sustaining the anvil during the welding operation by a rigid support upon the said base, and a former moved to and from the sheet metal and operated to press the same upon the said anvil, as and for the purpose set forth.

4. In a spiral-seam tube-welding machine, the combination, with suitable means for heating and welding the sheet metal, of a movable anvil projected within the newly-applied skelp, a base supporting the pipe-making fixtures, means, substantially as described, for sustaining the anvil during the welding operation by a rigid support upon the said base, a former moved to and from the sheet metal to press the same upon the said anvil, and a toggle operated, substantially as described, for locking the former in its operative position, as and for the purpose set forth.

5. In a spiral-seam tube-welding machine, the combination, with suitable means for heating and welding the sheet metal, of a movable anvil projected within the newly-applied skelp, a base supporting the pipe-making fixtures, means, substantially as described, for sustaining the anvil during the welding operation by a rigid support upon the said base, a former moved to and from the sheet metal to press the same upon the said anvil, and means for adjusting the former to and from the anvil to graduate the said pressure, as and for the purpose set forth.

6. In a spiral-seam tube-welding machine, the combination, with suitable means for heating and welding the sheet metal, of a movable anvil projected within the newly-applied skelp, a base supporting the pipe-making fixtures, means, substantially as described, for sustaining the anvil during the welding operation by a rigid support upon the said base, and a former hinged or pivoted parallel with the surface of the pipe and operated transverse thereto to press the sheet metal upon the said anvil, as and for the purpose set forth.

7. In a spiral-seam tube-welding machine, the combination, with suitable means for heating and welding the sheet metal, of a movable anvil projected within the newly-applied skelp, a base supporting the pipe-making fixtures, means, substantially as described, for sustaining the anvil during the welding operation by a rigid support upon the said base, and a former and lever mounted upon a pivot parallel with the axis of the pipe and moved to and from the sheet metal to press the same upon the said anvil, as and for the purpose set forth.

8. In a spiral-seam tube-welding machine, the combination, with suitable means for heating and welding the sheet metal, of a movable anvil projected within the newly-applied skelp, a base supporting the pipe-making fixtures, means, substantially as described, for sustaining the anvil during the welding operation by a rigid support upon the said base, a movable former arranged to press the sheet metal upon the said anvil, and a rock-shaft connected to the former and the anvil and operated to move the former to and from the pipe and to raise and sustain the anvil rigidly upon the bed during the welding operation, as and for the purpose set forth.

9. In a spiral-seam tube-welding machine, the combination, with suitable means for heating and welding the sheet metal, of a movable anvil projected within the newly-applied skelp, a base supporting the pipe-making fixtures, means, substantially as described, for sustaining the anvil during the welding operation by a rigid support upon the said base, a movable former arranged to press the sheet metal upon the said anvil, feeding-rollers applied to the skelp, and a rock-shaft connected to the former, the anvil, and the feeding-rollers, and operated to move the former, the anvil, and the feeding-rollers simultaneously, in the desired manner, prior to the welding operation, as and for the purpose set forth.

10. In a spiral-seam tube-welding machine in which a straight skelp is fed obliquely to a cylindrical pipe and welded thereto at the tangential point, the combination, with suitable means for bending the skelp, means for heating the skelp at the tangential point, and an anvil and former, operating substantially as described, to weld the skelp at such heated spot, of feeding-rollers applied to the cold skelp at right angles thereto in advance of the weld and operating upon the skelp before the same is bent to rotate the pipe within the pipe-mold, substantially as herein set forth.

11. In a spiral-seam tube-welding machine, the combination, with blank-forming, blank-heating, and blank-welding mechanism, of feeding-rollers applied to the skelp adjacent to the weld, a driving-shaft for actuating by suitable connections the blank-forming and blank-welding mechanism, and means connected with the said driving-shaft for rotating the rollers intermittently between the successive forming or welding operations, substantially as herein set forth.

In testimony whereof I have hereunto set my hand in the presence of two subscribing witnesses.

THOMAS S. CRANE.

Witnesses:
L. LEE,
HENRY J. MILLER.